United States Patent [19]

Ita et al.

[11] Patent Number: 4,803,618
[45] Date of Patent: Feb. 7, 1989

[54] MULTIPROCESSOR SYSTEM HAVING COMMON MEMORY

[75] Inventors: Noboru Ita; Shigeru Mitsugi, both of Yamato, Japan

[73] Assignee: Panafacom Limited, Kanagawa, Japan

[21] Appl. No.: 819,658

[22] Filed: Jan. 17, 1986

[30] Foreign Application Priority Data

Jan. 19, 1985 [JP] Japan ............................ 60-008073

[51] Int. Cl.⁴ ...................... G06F 15/16; G06F 13/00
[52] U.S. Cl. .................................... 364/200; 364/134
[58] Field of Search ... 364/200 MS File, 900 MS File

[56] References Cited

U.S. PATENT DOCUMENTS

| | | | |
|---|---|---|---|
| 4,096,571 | 6/1978 | Vander Mey | 364/200 |
| 4,212,057 | 7/1980 | Devlin et al. | 364/200 |
| 4,282,572 | 8/1981 | Moore, III et al. | 364/200 |
| 4,354,262 | 10/1982 | Guézou et al. | 364/200 |
| 4,368,514 | 1/1983 | Persand et al. | 364/200 |
| 4,380,798 | 4/1983 | Shannon et al. | 364/200 |
| 4,398,246 | 8/1983 | Frediani et al. | 364/200 |
| 4,433,394 | 2/1984 | Torii et al. | 365/78 |
| 4,435,792 | 3/1984 | Bechtolsheim | 365/230 |
| 4,611,275 | 9/1986 | Garnier | 364/200 |

*Primary Examiner*—Felix D. Gruber
*Attorney, Agent, or Firm*—Armstrong, Nikaido, Marmelstein & Kubovcik

[57] ABSTRACT

A plurality of processors use a common memory under a time division control mode by way of a time division data bus. In the multiprocessor system, flip-flops are mounted for holding respective write permission flags. Also, a logic gate is employed, operative to allow the processor to write data in the common memory when both the write permission flag and the write request signal from the processor are generated simultaneously. Further, multiplexers are used so that the write operation can be achieved under the time division control mode.

10 Claims, 7 Drawing Sheets

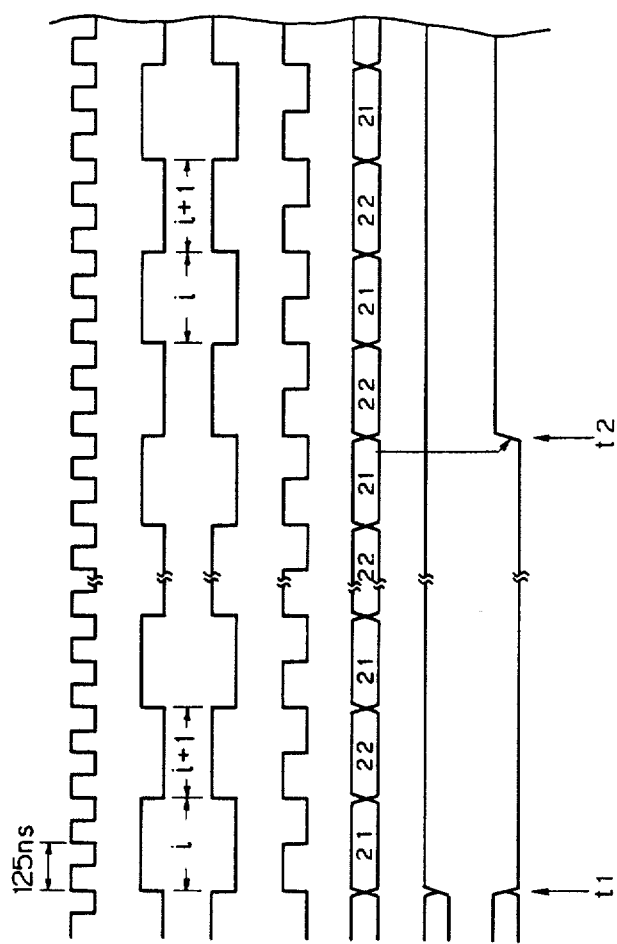

MULTIPROCESSOR SYSTEM HAVING COMMON MEMORY

BACKGROUND OF THE INVENTION

1. Field of the Invention

The present invention relates to a multiprocessor system having a memory commonly used by the processors. More particularly, the processors are operated under a time division control mode.

2. Description of the Related Art

A multiprocessor system is comprised of a plurality of processors, for example, microprocessors. The processors are usually used for performing so-called load distribution. Therefore, the related multiprocessor system can carry a heavy load, i.e., many peripheral terminal equipment.

In general, the multiprocessor system contains, other than the processors, memories, data buses, and so on. From an economic viewpoint, it is preferable not to mount individual memories for each processor, but to mount a single memory for common use by these processors. This is also true of the data buses, i.e., a single time division data bus is preferably employed and distributed between the common memory and the processors.

Common usage of the memory is preferable from an economic viewpoint but suffers from the problem of write operations to the memory being often commanded from the processors simultaneously. Two or more simultaneously read operations to the memory are possible, but two or more simultaneous write operations cause the serious trouble of erasure of significant data stored therein. That is, when one of the processors writes data in the memory, the remaining processors must be inhibited from their respective write operations and must wait until they are allowed to use the memory.

In the prior art, the inhibition from the write operation is established with the use of both a halt signal line and a start signal line. When one of the processors, i.e., a master processor, is going to write data to the memory, the memory first applies a halt signal to the remaining processors, i.e., slave processors, in a case where, for example, an initial program loading (IPL) is to be executed. Therefore, during the execution of the IPL by the master processor, the slave processors cannot be operated due to the halt signal transferred, via the halt signal line, from the main processor. When the execution of the IPL is completed, the main processor applies the start signal to allow the slave processors to start operating. The slave processors then watch a flag concerned to determine whether or not the flag indicates that the slave processors are now operable. The flag is written in the memory by the master processor. If the flag indicates the slave processors can operate, then these slave processors can start executing individual jobs.

However, there is a problem in the prior art multiprocessor system, that is, the slave processors can no longer operate once the halt signal is issued from the master processor. That is, the slave processors are left in an idle state during the provision of the halt signal. Such an idle state clearly causes a loss in throughput of the overall multiprocessor system.

SUMMARY OF THE INVENTION

Accordingly, an object of the present invention is to provide a multiprocessor system in which a common memory is protected from erasure of data stored therein, during the write operation of the master processor, by other processors, while the other processors are left in a workable state except for the write operation to the common memory.

To attain the above object and features of the present invention, there are newly introduced into the multiprocessor system at least a first member, second member, and third member. The first member is operative to store therein a write permission flag given from the master processor. The second member is operative to receive both the write permission flag and the write request signals given from the processors and to produce a write enable signal for activating the common memory, if both the flag and the signal are generated simultaneously. The third member is operative to determine each timing for providing each write enable signal to the common memory, under the time division control mode, pertaining to respective processors.

BRIEF DESCRIPTION OF THE DRAWINGS

The above object and features of the present invention will be more apparent from the following description of the preferred embodiments with reference to the accompanying drawings, wherein:

FIGS. 5A through 5G depict waveforms of signals appearing at major portions in the system of FIGS. 4A and 4B.

DESCRIPTION OF THE PREFERRED EMBODIMENTS

Figure 1:
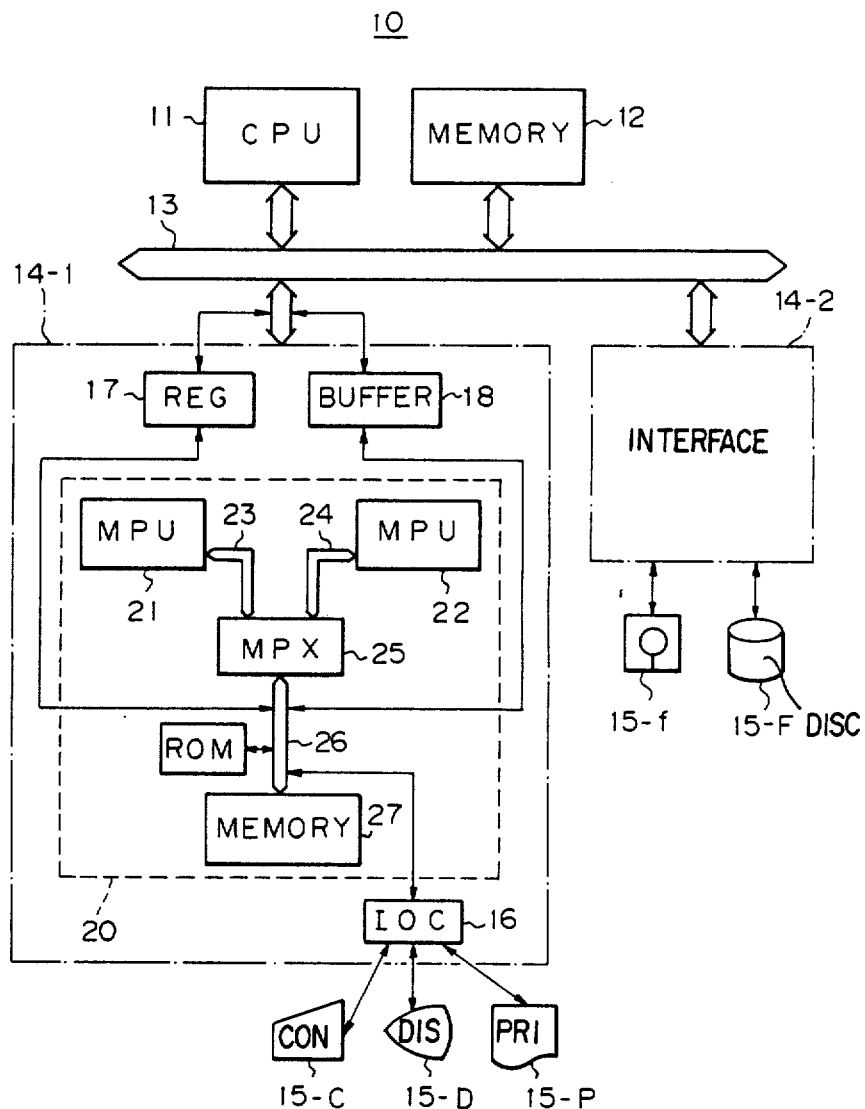
FIG. 1 is a general view of a known computer system containing a multiprocessor system to which the present invention is applied.

FIG. 1 is a general view of a known computer system containing a multiprocessor system to which the present invention is applied. The overall computer system is set up with a host processor, i.e., a central processing unit (CPU) 11, an external memory 12, a bus 13, a plurality of interface adapters 14-1, 14-2, and so on, and peripheral terminal equipment, such as a console unit 15-C, a display unit 15-D, a printer unit 15-P, a floppy disc unit 15-$f$, and a file disc unit 15-F. The multiprocessor system to which the present invention relates is enclosed by a broken line 20. The multiprocessor system 20 is a primary part of each interface adapter 14-1, 14-2, and so on. The multiprocessor system 20, on one hand, cooperatively linked with the host processor (CPU) side and, on the other hand, with the input/output (I/O) unit side. The linkages with the host processor side and the I/O unit side are performed by way of respective interfaces, that is, an I/O controller (IOC) 16 and a set of a register (REG) 17 and a buffer memory 18.

The multiprocessor system 20 is comprised of, at least, a first processor, for example, a microprocessor (MPU) 21, a second processor, for example, a microprocessor (MPU) 22, a first exclusive data bus 23, a second exclusive data bus 24, a data bus multiplexer 25, a time division data bus 26, and a common memory 27, referred to previously. The common memory 27 is usually made of a random-access memory (RAM). The bus 26 is also provided with a read-only memory (ROM) and the IOC 16. In the example of FIG. 1, two processors 21 and 22 are illustrated, however, the number of processors is not limited to two but can be three or more. In the embodiment of the present invention, the first and second processors 21 and 22 are used, the former processor (21) mainly cooperating with the host processor 11, and the latter processor (22) mainly cooperating with the I/O units 15. Thus, a load distribution can be attained. This releases the host processor 11 from a heavy task. In other words, only the register 17, namely, an adapter control register, exists when viewed from the host processor side. The register 17 stores therein a command to the adapter 14-1 given from the host processor, which command is to be given to the first processor 21, i.e., a master processor. The register 17 also stores other information, for example, the status of the first processor or the second processor, i.e., a slave processor. Thus, the interface adapter 14-1 operates as an I/O control channel apparatus. Incidentally, the buffer memory 18 is used by both the processors 21 and 22 for achieving data transfer between the memory 12 and the adapter 14-1 under a direct memory access (DMA) control mode.

Figure 2:
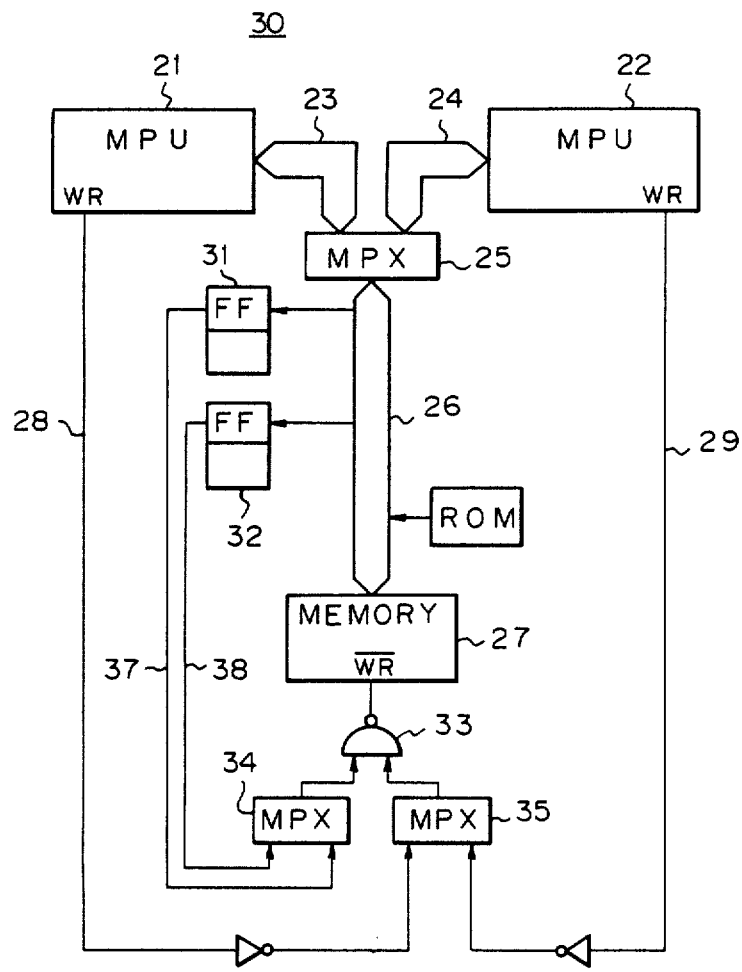
FIG. 2 illustrates a principle construction of a multiprocessor system according to the present invention.

FIG. 2 illustrates a principle construction of a multiprocessor system according to the present invention. In FIG. 2, members the same as those of FIG. 1 are represented by the same reference numerals or symbols, the same for later figures. The multiprocessor system 30 of the present invention is featured by first, second, and third members. The first member is operative to store therein a write permission flag given from the master processor 21, which member is specifically comprised of flip-flops (FF) 31 and 32.

The second member is operative to receive both the write permission flag and the write request signals given from the master and slave processors 21 and 22, at their write request ports WR, so that the second member produces a write enable signal for activating the common memory 27, which signal is applied to its write permission port WR, if both the write request signal and the corresponding write permission flag are generated simultaneously. The second member is specifically comprised of a logic gate 33, which is illustrated in this figure in the form of a NAND gate. In actuality, the logic gate 33 is made of a NOR gate, as will be disclosed hereinafter.

The third member is operative to determine the timings for providing each write enable signal to the common memory 27, under the time division control mode, alternately for the master processor 21 and the slave processor 22. The third member is specifically comprised of a flag line multiplexer 34 and a write request line multiplexer 35 under synchronous cooperation with the data bus multiplexer 25 mentioned previously.

The data bus multiplexer 25 operates such that the data on the master exclusive data bus 23 and the slave exclusive data bus 24 are allowed to pass therethrough to the time division data bus 26 at the i-cycle and (i+1)-cycle, respectively, wherein i denotes positive odd integers such as i = 1, 3, 5, 7 . . . . Thus, the processors 21 and 22 alternately supply respective data (or receive respective data) to (or from) the data bus 26, thus establishing the time division control mode.

The flip-flops 31 and 32 are connected, via flag lines 37 and 38, with the flag line multiplexer 34. The write request ports WR of the processors 21 and 22 are connected, via write request lines 28 and 29 and also respective inverters, with the write request line multiplexer 35. The multiplexer 35 operates such that the write request signal on the line 28 is produced therefrom at the i-cycle selectively, while the write request signal on the line 29 is produced therefrom at the (i+1)-cycle selectively. The meaning of the i and (i+1)-cycles will be explained hereinafter. The write request signal assumes, when it is activated, a logic "0", and therefore the write request signal of logic "1" indicates a request for a read operation to the common memory 27. It should be noted that, in the present invention, the read operation is irrelevant and will not be referred to further. This is because the read operation itself does not destroy the data stored in the common memory 27, even if a read operation is erroneously achieved thereto by either one or both of the processors 21 and 22.

Similarly, the flag line multiplexer 34 operates such that any write permission flag in the flip-flop 31 is produced therefrom at the i-cycle selectively, while any write permission flag in the flip-flop 32 is produced therefrom at the (i+1)-cycle selectively.

The NAND gate 33 receives, at its first and second inputs, the outputs from the multiplexers 34 and 35, respectively, and produces the resultant output, i.e., the write enable signal, therefrom for application to the write permission port $\overline{WR}$ of the common memory 27. In the example, the memory 27 is activated for the write operation when the write enable signal from the gate 33 assumes the logic "0". This means that the active write enable signal is obtained under a condition where both the first and second inputs of the gate 33 receive logic "1" simultaneously.

Thus, during the i-cycle, when both the write permission flag in the flip-flop 31 and the write request signal from the write request port WR of the processor 21 are generated, the processor 21 can write data in the common memory 27. Similarly, during the (i+1)-cycle, when both the write permission flag in the flip-flop 32 and the write request signal from the write request port WR of the processor 22 are generated, the processor 22 can write data in the common memory 27.

If the master processor 21 starts execution of an initial program loading (IPL) due to, for example, a power-on reset, the processor 21 transfers the related program data from the ROM to the common memory 27 by a write operation. In this case, during the write operation, the slave processor 22 must be inhibited from a write operation in order not to damage the thus loaded program data. For this, the master processor 21 operates first such that the write permission flag is set only in the flip-flop of its own side, i.e., the flip-flop 31. Therefore, even if the processor of the other side, i.e., the slave processor 22, issues the write request signal to the memory 27, the write request signal cannot pass through the NAND gate 33, since, during the (i+1)-cycle, the multiplexer 34 applies the write flag of logic "0" from the flip-flop 32 to the first input of the NAND gate 33. Thus, the slave processor 22 is inhibited from a write operation to the common memory. It should be understood that the slave processor 22 is only inhibited from the write operation, it still can perform other operations such as a read operation from the common memory 27 or data transfer with the memory 12 (FIG. 1) during the (i+1)-cycle. In short, the processor 22 is workable except for the write operation. As mentioned previously, in the prior art, the halt signal is given to the slave processor 22, and therefore the processor 22 is put in an unworkable state until the master processor 21 completes the build-up operation, for example, the IPL operation.

Figure 3A:
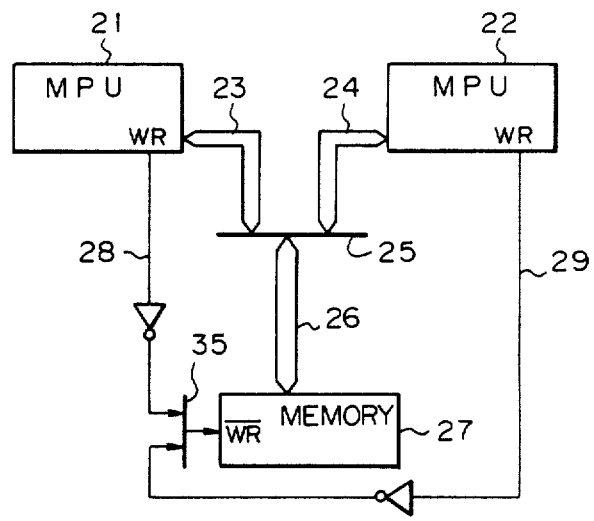
FIGS. 3A, 3B, and 3C are schematic views representing three basic states of the multiprocessor system shown in FIG. 2, respectively.
Figures 3B, 3C:
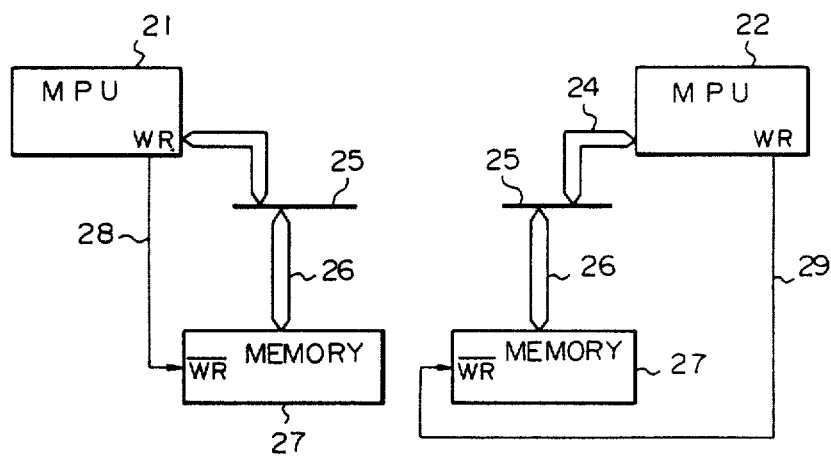

FIGS. 3A, 3B, and 3C are schematic views representing three basic states of the multiprocessor system shown in FIG. 2, respectively. The first basic state of FIG. 3A is a normal operation state, i.e., a usual running state. In this state, the master processor 21 sets logic "1" to both the flip-flops 31 and 32. Assuming that the processors 21 and 22 issue the respective write request signal from their write request ports WR, the write request signals of logic "1" from the respective inverters are produced alternately from the write request line multiplexer 35 at the i-cycle and (i+1)-cycle, respectively. Thus, the write permission port WR of the common memory 27 receives the write enable signal, and thereby the processor 21 writes data in the common memory 27 at the allotted i-cycle, while the processor 22 write data therein at the allotted (i+1)-cycle. It should be understood that, in FIG. 3A, since the flip-flops 31 and 32 of FIG. 2 now hold respective write permission flags, both logic "1", the flag line multiplexer 34 provides equivalently no substantive multiplexing operation. Therefore, the multiplexer 34 is not illustrated in FIG. 3A. In this case, further, the NAND gate 33 of FIG. 2 functions merely as an inverter. Therefore, the gate 33 is also not illustrated in FIG. 3A.

Referring to FIG. 3B, the view schematically illustrates a state where only the processor 21 is allowed to write data, the other processor 22 being inhibited from the same. In this case, the master processor 21 first sets the logic "1" to the flip-flop 31 and the logic "0" to the flip-flop 32. In the thus set state, the write enable signal regarding the processor 21 is applied to the write permission port WR of the common memory 27, and thereby the desired write operation can be started. On the other hand, any write request signal from the other processor 22 is cancelled by the write permission flag, now preset to be logic "0" in the flip-flop 32.

Referring to FIG. 3C, the view schematically illustrates a state where only the processor 22 is allowed to write data, the other processor 21 being inhibited from the same. In this case, the master processor 21 first sets the logic "0" to the flip-flop 31 and the logic "1" to the flip-flop 32. In the thus set state, the write enable signal regarding the processor 22 is applied to the write permission port WR of the common memory 27, and thereby the desired write operation can be started. On the other hand, any write request signal from the other processor 21 is cancelled by the write permission flag, now preset to be logic "0" in the flip-flop 31.

Figure 4A:
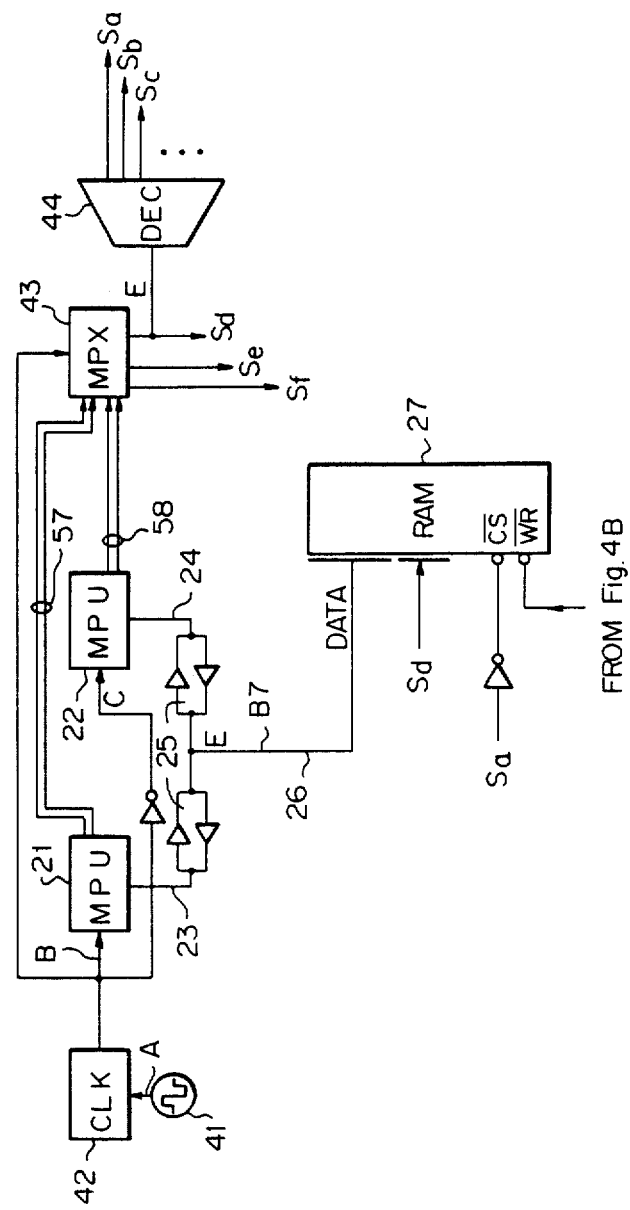
FIGS. 4A and 4B illustrate a detailed example of the multiprocessor system shown in FIG. 2.
Figure 4B:
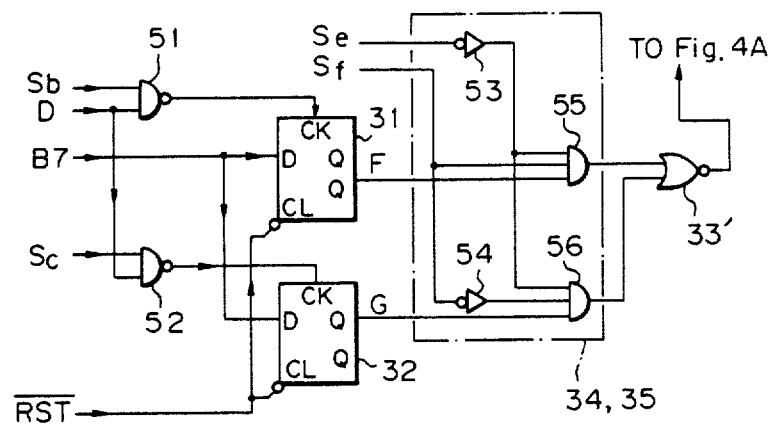

FIGS. 4A and 4B illustrate a detailed example of the multiprocessor system shown in FIG. 2. FIGS. 5A through 5G depict waveforms of signals appearing at major portions in the system of FIGS. 4A and 4B. That is, the signals appearing at the portions A through G are depicted in their waveforms in FIGS. 5A through 5G, respectively. A clock source 41 generates a master clock as shown in FIG. 5A. The master clock is processed in a clock generator 42 to produce control clocks. One of the control clocks (FIG. 5B) is applied, on the one hand as an MPU execution clock, to the master processor (MPU) 21. The other of the control clock (FIG. 5C) is applied, as an MPU execution clock, to the slave processor (MPU) 22. The alternating control clocks of FIGS. 5B and 5C make possible the time division control. In this case, the aforesaid examples of the i-cycle and (i+1)-cycle are shown by the characters "i" and "i+1" in FIG. 5B. During the i-cycle, the processor 21 is allowed to execute its job between the inside and the outside including the aforesaid write operation, while the processor 22 is limited to executing the job inside. Contrary to the above, during the (i+1)-cycle, the processor 22 is allowed to execute its job between the inside and the outside including the write operation, while the processor 21 is limited to executing the job inside.

The processors 21 and 22 are connected, via respective exclusive data buses 23 and 24, with the data bus multiplexer 25. The multiplexer 25 is constructed with known two-way gates. The two-way gates (25) are connected, via the time division data bus 26, with the common memory (RAM) 27, at its data I/O port.

On the other hand, the processors 21 and 22 are connected, via pairs of an address bus and control bus 57 and 58, with a multiplexer (MPX) 43. A part of the outputs from the multiplexer 43 is transformed, by means of a decoder (DEC) 44, to signals $S_a$, $S_b$, $S_c$, and so on. The remaining outputs from the multiplexer 43 are composed of signals $S_d$, $S_e$, $S_f$, and so on. The meanings of these signals are as follows:

$S_a$ . . . RAM chip selection signal
$S_b$ . . . FF31 selection signal
$S_c$ . . . FF32 selection signal
$S_d$ . . . address signal for the RAM (or the ROM)
$S_e$ . . . write request signal
$S_f$ . . . executive processor selection signal The input bus of the decoder (DEC) 44 and the time division data bus 26 are used under the time division control mode. Therefore, these buses are occupied by the processors 21 and 22 alternately as shown in FIG. 5E (21→22→21→ . . . ). The signals $S_a$ and $S_d$ are used to activate the RAM 27 and access the same, respectively, for writing the data on the bus 26, only when the write enable signal is given from the circuit of FIG. 4B and applied to the write permission port WR of the common memory (RAM) 27.

The remaining signals $S_b$, $S_c$, $S_e$, and $S_f$ are given to the circuit of FIG. 4B. In FIG. 4B, the flip-flops 31 and 32, the multiplexers 34 and 35, and the logic gate 33' are as already explained. However, the logic gate 33' is shown in FIG. 2, in the form of not an NOR gate as in FIG. 4B, but a NAND gate. Other NAND gates 51 and 52 of FIG. 4B are used for controlling the flip-flops 31 and 32. The NAND gates 51 and 52 receive, at their first inputs, the FF31 selection signal $S_b$ and the FF32 selection signal $S_c$. The outputs from the gates 51 and 52 are applied to the clock terminals CK of respective flip-flops 31 and 32. The data input terminals D of the respective flip-flops 31 and 32 are connected to the data bus 26 of FIG. 4A, particularly to the seventh bit line B7, which indicates the write permission flag. Each of the NAND gates 51 and 52 receives, at its second input, a write timing pulse shown in FIG. 5D. The low active write timing pulse is generated at every latter half cycle of the selection states (refer to the selection states 21→22→21→ . . . in FIG. 5E). The write timing pulse is useful for extracting the stabilized data B7 and signals $S_b$ and $S_c$. Since multiplexers 25 and 43 are used, the data B7 and signals $S_b$ and $S_c$ are unstable during the transition of the multiplexing. Such unstable data and signals can be disregarded with the use of the write timing pulse.

When power is supplied to the interface adapter 14-1 (FIG. 1) at the time t1 (FIG. 5G), a reset signal $\overline{RST}$ is applied to both the flip-flops 31 and 32 of FIG. 4B at their clear terminals CL. Therefore, the flip-flop 31 produces logic "1", and the flip-flop 32 produces logic "0", from their $\overline{Q}$ and Q outputs respectively (refer to FIGS. 5F and 5G). Therefore, initially the processor 21 can automatically obtain priority to write the RAM 27. At the same time, the control clock for the processor 21 rises, while the control clock for the processor 22 ceases. This means that the time division control is forcibly started from the master processor 21. Then, the processor 21 presets the write permission flag of logic "1" (B7) in the flip-flop 31 at the i-cycle under control of the signal $S_b$ for achieving the IPL operation. Further, the write permission flag of logic "1" is transferred to the NOR gate 33'. To be specific, the processor 21 issues the low active write request signal $S_e$ of logic "0", which is applied, via an inverting amplifier 53, to both AND gates 55 and 56. The write request of the processor 21 is effective every time the i-cycle occurs. The occurrence of the i-cycle is represented by the processor selection signal $S_f$. The signal $S_f$ is logic "1", when the processor 21 is to be selected, and opens the AND gate 55. Contrary to the above, when the signal $S_f$ is logic "0", it opens the AND gate 56 by way of the inverting amplifier 54. Thus, the write request signal with the write permission flag can pass through the AND gate 55 in the form of logic "1". This logic "1" is inverted by the NOR gate 33' to produce the low active write enable signal of logic "0", which can activate the common memory (RAM) 27 to write therein the data (DATA) to be stored.

In a case where the normal state of FIG. 3A is to be established, the write permission flag (B7) is sequentially set in the flip-flop 31 at the i-cycle and also in the flip-flop 32 at the (i+1)-cycle. This state starts at the time t2 of FIG. 5G. That is, the duration between the times t1 and t2 indicates the state of FIG. 3B, and the duration after the time t2 indicates the state of FIG. 3A.

Figure 6:
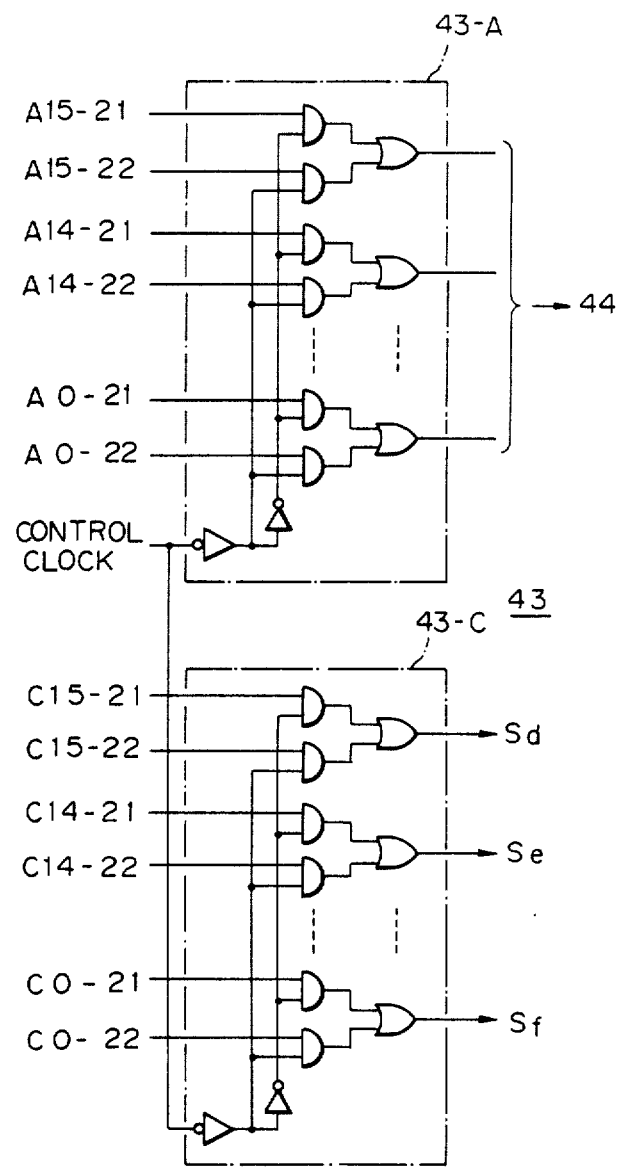
FIG. 6 illustrates a circuit diagram of the multiplexer shown in FIG. 4A.

FIG. 6 is a circuit diagram of the multiplexer shown in FIG. 4A. The multiplexer 43 is divided into an address bus multiplexer 43-A and a control bus multiplexer 43-C. Both multiplexers have substantially the same construction. That is, in the multiplexer 43-A, 16 pairs of AND gates are mounted for each of the 16 address bit lines A15-21, A15-22, A14-21, A14-22, ... A0-21, A0-22 (21 and 22 denote the master processor side and the slave processor side). Each AND pair is connected with respective OR gates, as illustrated. Similarly, in the multiplexer 43-C, 16 pairs of AND gates are mounted for each of the 16 control bit lines C15-21, C15-22, C14-21, C14-22, ... C0-21, C0-22. In actuality, not all of these bit lines are used at one time. At the i-cycle, the upper side AND gates are opened, and, at the (i+1)-cycle, the lower side AND gates are opened, by means of an inverting amplifier receiving the control clock (refer to FIG. 5B) from the clock generator 42 (FIG. 4A) and an inverter connected to the output of the inverting amplifier. These address bit lines A15-21 . . . A0-22 form the address bus 57 of FIG. 4A, and the control bit lines C15-21 . . . C0-22 form the control bus 58 of FIG. 4A.

The above explanations were made by taking as an example a case where two processors 21 and 22 are mounted in the multiprocessor system. It will be obvious that the present invention is not restricted to a system having two processors 21 and 22 and that three or more processors can be adapted to the system according to the present invention. If, for example, three processors are used, one of these is selected to be a master processor and the remaining two processors to be slave processors. In this case, with reference to FIG. 2, a third exclusive data bus, other than the buses 23 and 24, is further required. A flip-flop other than the flip-flops 31 and 32 is also required. The multiplexers 25, 34, and 35 are to be modified so as to select one among the three buses or lines. The logic gate 33' (refer to FIG. 4B) must be a three-input NOR gate.

As mentioned above in detail, in the multiprocessor system according to the present invention, memory protection can be ensured without leaving the processors other than the master processor idle. Further, the flip-flop 32 can be used as an indication flag to the processor 22 during the firmware loading. That is, the processor 22 can determine its status by watching the flag in the flip-flop 32. Furthermore, for recent LSI's, the present invention is useful for ensuring correct operation. To be more specific, recent LSI's are designed in such a manner that, for a particular port or ports, an input signal becomes valid every time the same input signal is applied thereto two times successively. Such double access to the port is useful for reducing the number of the ports. In other words, the same port is used by two different signals, first for the usual signal and second for the double access signals. If the processor 21 is to start the write operation by receiving the double access signals, the processor 22 must not start the write operation at the time between the occurrences of the double access signals. This erroneous write operation by the processor 22 is prevented by the control of the write permission flags according to the present invention.

We claim:

1. A multiprocessor system comprising:
   (a) a plurality of processors, one of the processors to be operated as a master processor, the remaining processors being slave processors, said plurality of processors producing at least write request signals;
   (b) a common memory to be accessed by the plurality of processors one by one in a time division control mode by a time division data bus;
   (c) a first means for storing therein a write permission flag from the master processor through the time division data bus, the write permission flag being allotted to each of the processors by the master processor;
   (d) a second means for receiving both the write permission flag from the first means and write request signals issued from the plurality of processors through the time division control bus, the second means producing a write enable signal to be applied to the common memory for activating the same, if the write permission flag from the master processor and the write request signal from one of the processors are generated simultaneously; and
   (e) a third means for determining timing for providing said write enable signal to the common memory, under the time division control mode, pertaining to each of the plurality of processors wherein said slave processors being inhibited only from a write operation to the common memory during an initial program load.

2. A system as set forth in claim 1, wherein said first means is comprised of flip-flops allotted to each of the plurality of processors, each of the flip-flops set or reset to hold or not hold the write permission flag.

3. A system as set forth in claim 2, wherein said second means is comprised of a logic gate to detect simultaneous occurrence of both said write permission flag and the write request signal.

4. A system as set forth in claim 3, wherein said third means is comprised of both a write permission flag line multiplexer and a write request signal line multiplexer.

5. A system as set forth in claim 4, wherein said flip-flops are mounted for the master processor and the slave processors, each of the flip-flops is made of a D-flip-flop having a data input terminal, a clock terminal, a first output terminal, a second output terminal, and a clear terminal, the first output terminal and the second output terminal used for outputting the write enable signal of the master processor and the write enable signal of the slave processors respectively.

6. A system as set forth in claim 5, wherein said first and second output terminals of each flip-flop are respectively connected with said write permission flag line multiplexer and said write request signal line multiplexer and with said logic gate to produce said master processor and slave processor write enable signals alternately from the logic gate.

7. A system as set forth in claim 6, wherein said write permission flag line multiplexer and said write request signal line multiplexer each include a first AND gate and a second AND gate, the first AND gate having three inputs for receiving the write request signal, an executive processor selection signal, and the output signal from said first output terminal, the second AND gate having three inputs for receiving the write request signal, the executive processor selection signal, via an inverting amplifier, and the output signal from said second terminal.

8. A system as set forth in claim 7, wherein said logic gate is made of an NOR gate receiving two input signals given from said first and second AND gates.

9. A system as set forth in claim 8, wherein said master processor side flip-flop receives a first flip-flop selection signal, at its clock terminal, said write permission flag, at its data input terminal, and a general reset signal, at its clear terminal, said slave processor side flip-flop receives a second flip-flop selection signal, at its clock terminal, said write permission flag commonly, at its data input terminal, and said general reset signal commonly, at its clear terminal.

10. A system as set forth in claim 9, wherein said first and second flip-flop selection signals are applied to respective clock terminals in synchronization with a write timing pulse which specifies each term where the signals, which have switched by said multiplexers, are made stable.

* * * * *